United States Patent [19]

Nakamura

[11] 4,279,633

[45] Jul. 21, 1981

[54] METHOD OF PRODUCING MAGNETIC HEAD

[75] Inventor: Kazuo Nakamura, Toyonaka, Japan

[73] Assignee: Matsushita Electric Industrial Co., Ltd., Kadoma, Japan

[21] Appl. No.: 131,457

[22] Filed: Mar. 18, 1980

[51] Int. Cl.³ .............................................. G11B 5/42
[52] U.S. Cl. ......................................... 65/41; 65/42; 65/43; 65/59 R; 29/603
[58] Field of Search ................... 65/41, 42, 43, 59 R, 65/61; 29/603

[56] References Cited

U.S. PATENT DOCUMENTS

| | | | |
|---|---|---|---|
| 3,440,360 | 4/1969 | Sugaya | 29/603 |
| 3,819,348 | 6/1974 | Murray | 65/42 X |
| 3,845,550 | 11/1974 | Gooch et al. | 29/603 |
| 3,927,470 | 12/1975 | Case | 29/603 |
| 4,114,259 | 9/1978 | Dorreboom | 29/603 |

FOREIGN PATENT DOCUMENTS

| | | | |
|---|---|---|---|
| 50-138983 | 5/1977 | Japan | 29/603 |
| 50-142844 | 6/1977 | Japan | 29/603 |

*Primary Examiner*—Arthur D. Kellogg
*Attorney, Agent, or Firm*—Stevens, Davis, Miller & Mosher

[57] ABSTRACT

A gapped bar is formed of a pair of rectangular parallel-opiped magnetic core block having coil-winding grooves jointed to each other through a medium of a non-magnetic thickness. The gapped bar is provided with a plurality of non-magnetic spacer of a predetermined glass mold parts disposed to limit at least the front gap portion to a predetermined track width. Then, a head core is formed by cutting the gapped bar at the glass mold parts at a predetermined angle to the longitudinal axis of the gapped bar and then effecting required processing such as finishing of the cut surface. Finally, an annealing is effected on thus formed head core at a temperature higher than the deformation point of the glass constituting the mold glass part.

1 Claim, 10 Drawing Figures

METHOD OF PRODUCING MAGNETIC HEAD

BACKGROUND OF THE INVENTION

The present invention relates to a method of producing a magnetic head and, more particularly, to an improvement in an annealing method of a ferrite video head having a molded glass part. Still more particularly, the invention is concerned with a method which can simplify the known annealing treatment and which can avoid the adverse influence from fluctuation of the treatment while ensuring its treatment effect.

Conventionally, for producing a video head of narrow track width, it is a common measure to form a head core having a width greater than the effective track width, notches being formed in both side portions of the head gap so as to define the desired track width, and these notches are filled with a glass mold, as will be described later with reference to the drawings. The head core thus formed is usually subjected to an annealing to relieve stress in the glass which remains as a residual stress as a result of cooling of the glass.

This annealing has been made under a condition which is the same as that of the annealing of the mold glass, by holding the core head at the annealing point of the glass for a suitable time and then gradually cooling the head core.

However, the annealing mechanism in this treatment, in which the annealing condition for the glass is directly applied to the ferrite-and-glass composite body used for such as magnetic head, has not been satisfactory.

The defect of this annealing treatment is that, since the annealing point is highly critical, the time required for relieving the residual stress in the glass is largely changed even by a small fluctuation of the temperature from the given temperature.

SUMMARY OF THE INVENTION

It is, therefore, an object of the invention to overcome the above-described problem of the prior art annealing treatment in the production of a magnetic head.

To this end, according to the invention, there is provided a method of producing a magnetic head comprising the steps of: preparing a gapped bar constituted by a pair of rectangular parallelopiped magnetic core blocks having coil-winding grooves jointed to each other through a medium of a non-magnetic spacer of a predetermined thickness, the gapped bar having a plurality of non-magnetic glass mold parts disposed to limit at least the front gap portion to a predetermined track width; forming a head core by cutting the gapped bar at the glass mold parts at a predetermined angle to the longitudinal axis of the gapped bar and then effecting required processing such as finishing of the cut surface and processing of the tape sliding surface; and subjecting the head core thus formed to an annealing which is effected at a temperature higher than the deformation point of the glass constituting the glass mold parts.

The above and other objects, as well as advantageous features of the invention will become more clear from the following description of the preferred embodiment taken in conjunction with the accompanying drawings.

DESCRIPTION OF THE PREFERRED EMBODIMENTS

Before turning to the description of the preferred embodiment, a description will be made hereinafter as to the conventional method of producing a magnetic head, in order to clarify the drawbacks of the prior art and, hence, advantages of the present invention.

Figure 1A:
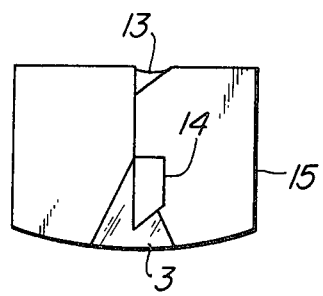
FIGS. 1a to 5 are illustrations of a magnetic head having a construction to which the invention is applied and steps for producing this magnetic head.
Figure 1B:
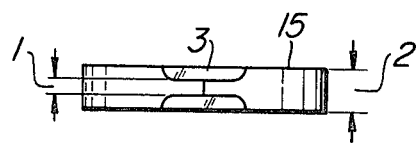
Figure 2A:
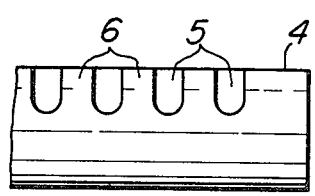
Figure 2B:
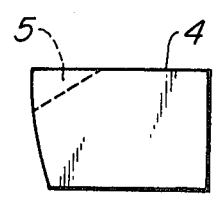

As will be seen from FIG. 1a showing a top plan and also from FIG. 1b showing a front elevation, a typical conventional video head of a small track width had, from a view point of wear resistance, a head core of a core width 2 greater than the effective track width 1 and notches 3 are formed in both sides of the head gap g to define the desired track width 1, the notch 3 being filled with glass mold.

A typical example of a process for producing this head will be described hereinunder with respect to FIG. 2a to FIG. 5.

Figure 3:
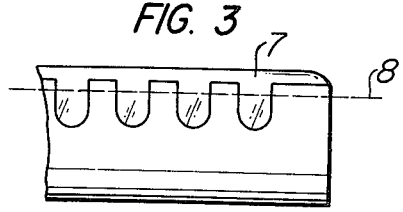
Figure 4:
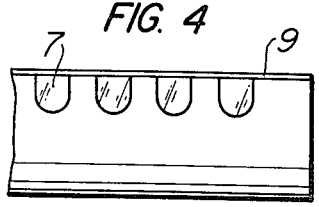

First of all, track limiting grooves 5 are formed in a core block 4 such that the remainder portions 6 between the limiting grooves 5 have the desired track width. Then, a molding is effected with a glass material 7 as shown in FIG. 3, and unnecessary parts are removed up to the depth shown by a broken line 8 by a grinding or the like. The surface shown by the broken line 8, which constitutes a gap-forming surface, is then subjected to a mirror-finishing or the like processing. Subsequently, a gap spacer member 9 is formed by a thin glass film or the like, as shown in FIG. 4. Two core blocks thus prepared are placed in abutment with each other in a manner shown in FIG. 5, and are subjected as one body to a heat-treatment, thereby the glass materials in each two associated grooves 5 are integrally jointed to form mold glass parts 10. A gapped bar 11 is thus formed. The gapped bar 11 is cut at its portion shown by a broken line 12, and a finishing and processing of the tape-sliding surface are effected on the cut surface to produce the head having the construction shown in FIG. 1.

Auxiliary means 13 for jointing the core blocks and the step for forming a slot 14 for winding coils are not described because they are not specifically related to the essence of the invention. The glass mold in the track limiting groove may aternatively be effected at the step shown in FIG. 5. The invention is to include such an alternative process.

It is conventional to subject the head core 15 thus formed to an annealing. This annealing is conducted under the same condition as that for the mold glass, i.e. by maintaining the head core 15 at annealing point of the mold glass for a suitable time length and then gradually cooling the same.

The annealing point of glass is usually defined as a temperature at which the viscosity of the glass becomes $2.5 \times 10^{13}$ poise. Practically, the annealing point is such a temperature that, when the glass is held at this temperature, the residual stress in the glass is released by the viscous flow of itself in 15 minutes and moreover the macroscopic shape of the glass is not changed. This annealing point is between a temperature at which the viscous flow comes to stop, i.e. the strain point, and a temperature at which the viscous flow instantaneously relieves the internal stress, i.e. the deformation point.

Usually, the strain point is defined as being the temperature at which the viscosity becomes $4\times 10^{14}$ poise. On the other hand, the term "deformation point" does not have any exact definition in relation to viscosity. However, in this specification, the term "deformation point" is used to mean, as is generally understood, the temperature at which the saturation of expansion takes place in the thermal-expansion characteristic curve of the glass. This temperature is sometime referred to also as "the softening point on the thermal expansion curve". This temperature is actually below the so-called softening point generally defined as the temperature at which the viscosity is $4.5\times 10^7$ poise.

Thus, conventionally, the annealing of the head core had been conducted under the same condition as the annealing for glass as a single body. However, the anneal mechanism observed on the composite material of ferrite and glass, e.g. a magnetic head, which is treated through the annealing under such a glass annealing condition, has not been clarified yet, and this annealing has been conducted in the expectation of that the residual stress taking place in the glass in the course of cooling of the gapped bar would be relieved by such an annealing. Nevertheless, as a matter of fact, the annealing brings about a certain advantageous effect. The result of the test conducted by the present inventors have showed that the mean value of the reproduction signal output from the head is raised and the width of the fluctuation is reduced, as will be seen from FIG. 6.

The defect of the conventional annealing treatment as stated above resides in that, since the annealing point is very critical, the time required for relieving the stress in the glass is widely varied by a small fluctuation of the given temperature at which the annealing is effected.

For instance, the result of a test conducted by the present inventors showed a severe time increase of the time length required for relieving the residual stress in the glass, when the annealing was carried out at a temperature 10° C. below the given temperature.

In this case, a fluctuation of annealing effect is unavoidable if the annealing time is fixed. It is well known that an error of the order of 10° C. is often caused by the error in the thermocouple itself and by a secular change. In order to avoid this, it is required to strictly manage the precision of the temperature measuring means and to adopt an unnecessarily long annealing time at the given temperature. These demands are quite inconvenient particularly in a mass-production of the magnetic head.

If the annealing given temperature is deviated from the desired temperature in the higher side, the insufficient viscous flow does not take place. However, conventionally, there has been a tendency that the annealing temperature is set somewhat below the desired temperature, in view of the fact that the gap would be deformed by a high annealing temperature and that the effect of relieving the residual stress is not so great even at such a high annealing temperature, as obtained at the annealing point. This tendency obviously enhances the aforementioned inconvenience, i.e. the lengthy annealing time, which takes place when the annealing is effected at a temperature below the annealing point.

Referring now to the slow cooling rate after the heating at the given temperature, there has been established no definite standard yet. Thus, practically, it has been a common measure to cool the core head as slowly as possible, resulting in an unnecessarily long annealing time.

These defects of the conventional annealing treatment are fairly obviated by the method of the invention, as will be understood from the following description taken in conjunction with the accompanying drawings.

The method of the invention has been obtained as a result of a series of experiments described hereinunder. FIG. 7 shows a heat treatment curve of a first experiment in which the head core is heated up to the annealing temperature at a rate of 7° C./min. and, after being maintained at the annealing temperature for 1 hour, cooled down slowly at a rate of 0.4° C./min. The slow cooling was altered into a furnace cooling after the head core has been cooled down to 200° C. at which the glass is practically within the solid region. This heat treatment curve is identical to that used in the conventional method for obtaining the result shwon in FIG. 6. The effect as shown in FIG. 6 could never be obtained with a trial head core having no mold glass (reference numeral 3 in FIGS. 1a and 1b) through the annealing.

Figure 5:
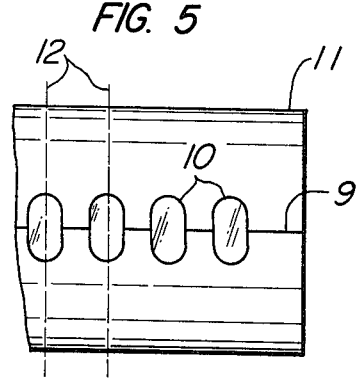
Figure 6:
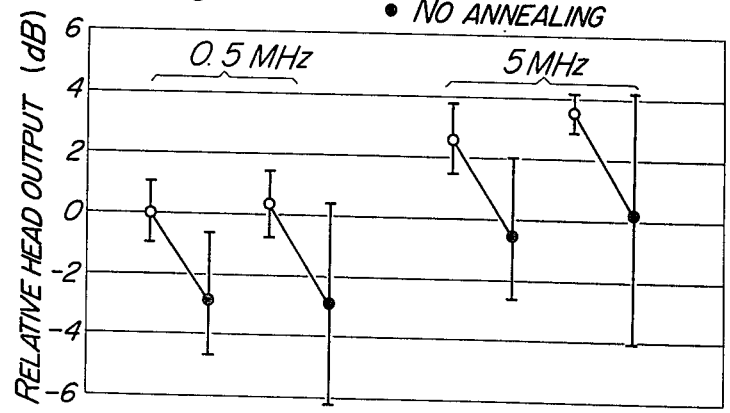
FIG. 6 shows a curve representing how the head output is affected by the annealings conducted in accordance with the conventional method and a method of the invention.
Figure 7:
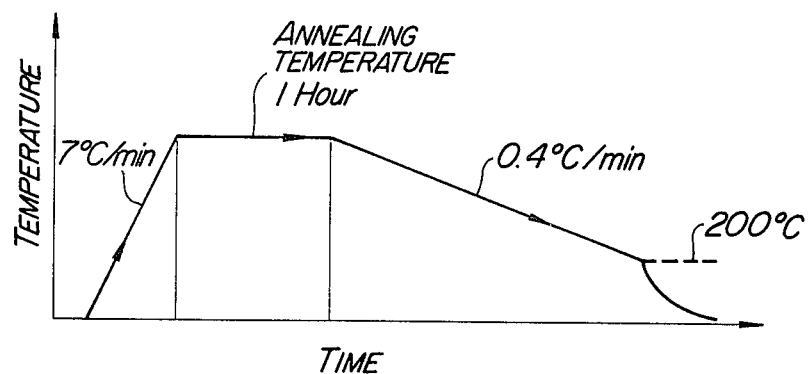
FIG. 7 shows a heat-treatment temperature curve of a conventional annealing treatment.

Further, the effect as shown in FIG. 6 could not be obtained with a trail head having the glass mold which head instead of being annealed is etched over its whole periphery so as to remove the layer degraded by the mechanical processing. This means that the conventional annealing without doubt, acts on the glass alone and that the adverse influence of the mechanical processing to the core itself is never suppressed by this conventional annealing. It was also found not to exhibit the effect shown in FIG. 6. with the head core without the annealing itself which is formed by cutting the gapped bar as shown in FIG. 5, althouth the gapped bar is conducted through the annealing after the formation of the gapped bar. This means that the annealing is meaningless unless it is effected at the stage of or after the formation of the head core by cutting. This, however, does not mean that the annealing has to be made after the formation of the core to remove the damage caused by the mechanical processing in the course of formation of the core.

Figure 8:
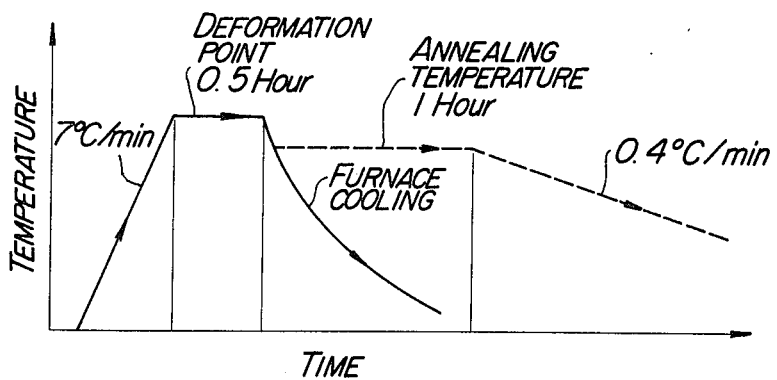
FIG. 8 shows a heat-treatment temperature curve of an annealing treatment in accordance with the invention.

Annealing was effected along the full-line curve shown in FIG. 8, in contrast to the above-mentioned conventional annealing process, by maintaining the head core at the deformation point of the glass and, then, effecting an oven cooling instead of the slow cooling at a rate of about 2° C./min. which is identical to the cooling rate adopted in the formation of the gapped bar. Thus the treated head core exhibited substantially equivalent output signal level as that shown in FIG. 6. This shows that the conventional annealing treatment effects nothing with respect to the head core but a mere softening and solidification of the mold glass whereas annealing after the formation of the head core, effects the head core considerably.

A similar test was conducted, in which, instead of the above-mentioned furnace cooling, the head core was additionally held at the annealing temperature for 1 hour and then cooled slowly at a rate of 0.4° C./min., as shown by a broken-line curve in FIG. 8. This process, however, exhibited no specific advantage over that shown by the full-line curve in FIG. 8. In such an additional thermal process shown by the broken-line curve the stress taking place in the region between the deformation point and the annealing point must be relieved, and the stress relieving effect must be added thereafter by the subsequent slow cooling. The test result exhibited, however, that such relief of stress does not affect substantially the output signal level of the head.

As has been described, it has been proved that the effect of annealing of the head core is brought about by a mere softening and solidification of the mold glass after the formation of the core. It is not clear, however, why such an effect is brought about. The most reliable reason is concerned with the boundary condition for the solidification of the glass. Namely, the glass is solidified in accordance with the boundary condition which is determined in accordance with the shape shown in FIG. 5, in the course of cooling in the formation of the gapped bar. Namely, the glass is solidified in such a condition that a considerable portion of its periphery is bound and restrained by the ferrite. However, in case of the head core shown in FIGS. 1a and 1b, if the glass mold is formed in this form from the beginning (although it is difficult to realize such a state), the glass is allowed to solidify under a boundary condition with reduced restraint by the ferrite. It is considered that the respective stress conditions in the mold glass and the ferrite of the head core formed under such a condition differ from those of the head core which is formed from the gapped bar by cutting after the formation of the gapped bar.

It is not clear which one of these two head cores exhibits higher level of signal output from the head core. Anyway, there is no doubt that the same stress condition as that obtained in the head core formed from the beginning in the form of head core can be obtained by employing steps of heating the head core obtained from a gapped bar up to the deformation point of the core to completely relieve the stress in the glass and, hence, the stress taking place in the ferrite caused by the stress in the glass, and then cooling the head core slowly. It is considered that the improvement of the signal output of the head owes to this treatment.

It is also considered that the slow cooling in the course of cooling and preservation at the annealing point as shown in FIG. 8 should naturally cause a change in the stress condition. According to the result of the test described before, however, this change in the stress condition is so small that no substantial change in the signal output of the head is caused.

Thus, the present inventors have found out that an annealing of the head can be simply conducted by effecting merely such treatment as to soften and solidify the mold glass part after the formation of the head core from the gapped bar. The most simple and sure way for this treatment is to effect a heat treatment at a temperature higher than the deformation point of the mold glass.

A description will be made hereinunder as to the stability of the annealing treatment in accordance with the invention. The requirement for the temperature at which the head core is to be maintained is to be higher than the deformation point. As a matter of fact, however, there is a practical upper limit for avoiding the loosening of the gap. This upper limit temperature varies depending on the viscosity characteristic of the glass in the temperature range above the deformation point.

According to the result of the tests conducted by the present invention employing several typical glasses for a glass mold, it has proved that no loosening of the gap takes place within a temperature range up to + 40° C. above the deformation point. This temperature width of 40° C. is large enough to accommodate the error of the thermocouple and the fluctuation of the production process. Also, the substantial relief of the internal stress of the glass is completed instantaneously so that no insufficient stress relief is caused even if the time length for preserving the head core at a constant temperature is maintained at a constant.

Concerning the cooling process after the head core has been held at the annealing temperature, another test was conducted employing a small-sized furnace having a cooling rate of about 5° C. per minute around the annealing point, which is greater than the rate of the aforementioned furnace cooling. No substantial adverse affect was observed even when the cooling was effected at such a large cooling rate.

The small-sized furnace employed in this test has a diameter of furnace core of 50$\phi$ and a soaking length of about 100 mm, which are much smaller than those used in the ordinary mass-production of the magnetic head. Therefore, no problem will be caused by adopting the furnace cooling in the cooling step, in the mass-production of the magnetic heads.

Although the invention has been described with specific reference to the production of a video head, the method of the invention can be applied to the production of various magnetic heads. More specifically, the annealing of the invention is a treatment which may be referred to as "boundary condition annealing", which is to treat the glass by reheating in accordance with the boundary condition in the final shape of the head, when this boundary condition differs from the boundary condition in the step of actual glass mold. Thus, the method of the invention is widely applicable to various magnetic heads which suffer the above-mentioned difference in boundary condition. As will be apparent from the nature of this annealing, it is necessary that this annealing is made in the state as close as possible to the final shape of the head.

For instance, in case of the video head shown in FIG. 1a, the final polishing of the tape sliding surface of the head is made after the head has been bonded to the assembly and mounted in the video cylinder. The heat treatment cannot be made in such a state and, therefor, has to be made immediately before the mounting in the video cylinder. The final polishing of the tape sliding surface, however, does not cause any substantial adverse affect because the processing amount is very small.

As has been described, according to the invention, it is possible to produce a magnetic head having a distinguished performance. This remarkable effect can be obtained without fail, because the treating condition has a tolerance large enough to absorb the fluctuation of the actual processing. Further, the annealing of the invention, which is very simple, can be accomplished in a shorter period of time than the conventional annealing.

Although the invention has been described through specific embodiment is not exclusive and various changes and modifications are possible without departing from the scope of the invention which is limited solely by the appended claims.

What is claimed is:

1. A method of producing a magnetic head comprising the steps of: preparing a gapped bar constituted by a pair of rectangular parallelopiped magnetic core blocks having coil-winding grooves and jointed to each other though a medium of a non-magnetic spacer of a predetermined thickness, said gapped bar having a plurality of non-magnetic glass mold parts disposed to limit at least a front portion of said gaps to a predetermined track width; forming a head core from said gapped bar by cutting said gapped bar at said glass mold parts at a predetermined angle to the longitudinal axis of the gapped bar and then finishing the cut surface; and subjecting the head core thus formed to an annealing which is effected at a temperature higher than the deformation point of the glass constituting said mold glass part.

* * * * *